United States Patent [19]

Burt

[11] 4,114,939
[45] Sep. 19, 1978

[54] VACUUM PICKUP HEAD

[75] Inventor: Harold S. Burt, Mendota, Ill.

[73] Assignee: Conco Inc., Mendota, Ill.

[21] Appl. No.: 723,027

[22] Filed: Sep. 13, 1976

[51] Int. Cl.$^2$ .............................................. B66C 1/02
[52] U.S. Cl. .................................................... 294/64 R
[58] Field of Search ................ 294/64 R, 65 R, 64 A, 294/64 B; 269/21; 251/325; 214/1 BS, 1 BT, 650 SC

[56] References Cited

U.S. PATENT DOCUMENTS

| 2,783,018 | 2/1957 | Lytle | 294/64 R |
|---|---|---|---|
| 4,006,929 | 2/1977 | Barker | 294/64 R |

OTHER PUBLICATIONS

Western Electric, Technical Digest No. 22, Apr., 1971.

Primary Examiner—James B. Marbert
Attorney, Agent, or Firm—Wegner, Stellman, McCord, Wiles & Wood

[57] ABSTRACT

A vacuum pickup head used with a stacker crane or similar structure wherein a plurality of the heads are suitably arranged on a movable support. The vacuum pickup head has a casing with an interior vacuum chamber and a depending container-engaging sealing element to seal the space between the casing and a container. A bottom wall of the casing has an annular air passage to provide a large airflow connection of said space with the vacuum chamber. A linearly-movable valve plate is positioned beneath the bottom wall for movement relative to the bottom wall to open and close said annular passage and fluid-powered motor means are positioned within the casing for moving the valve plate.

10 Claims, 4 Drawing Figures

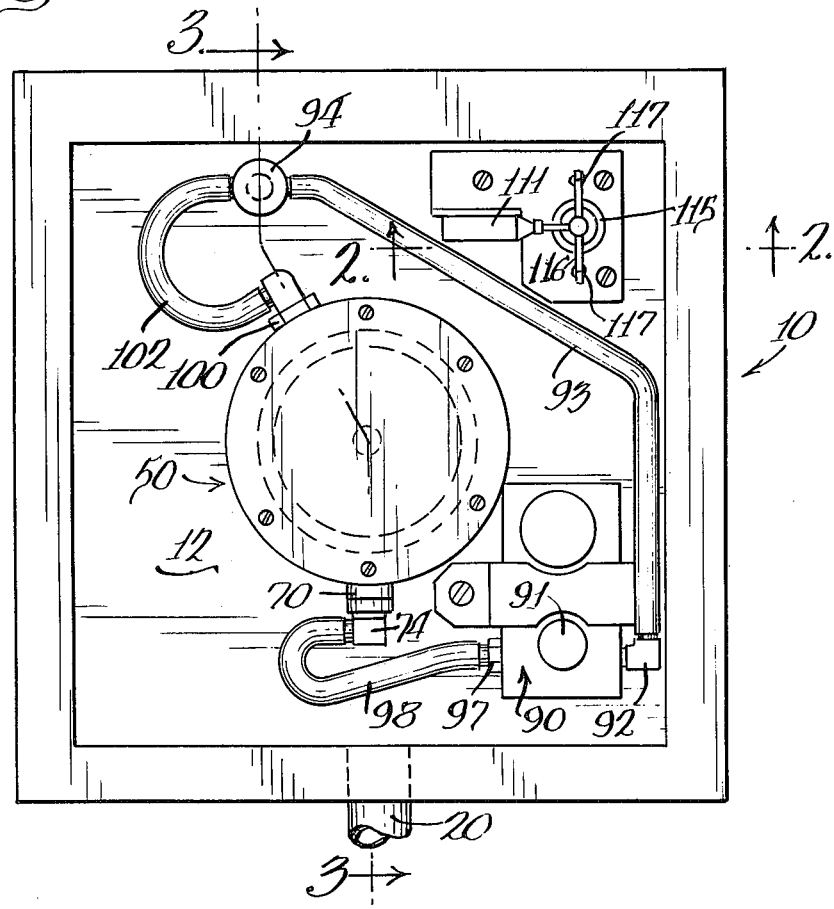
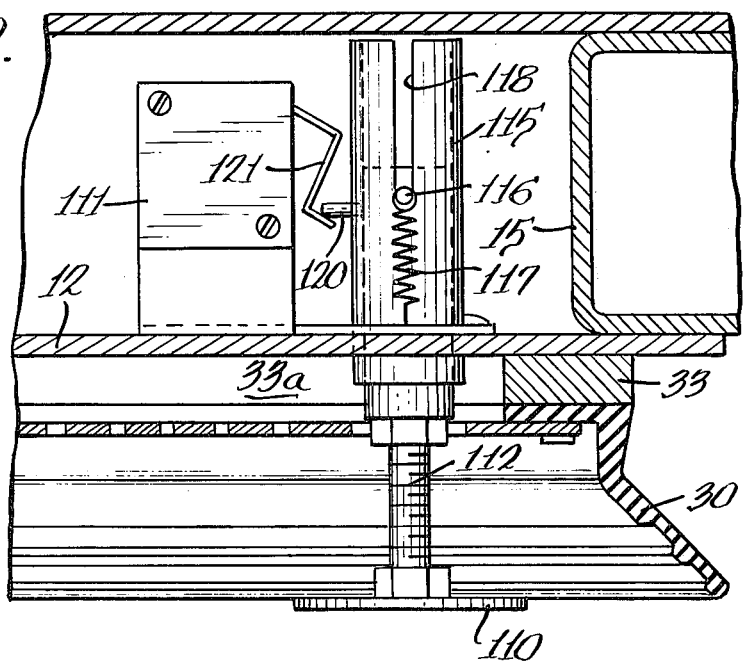

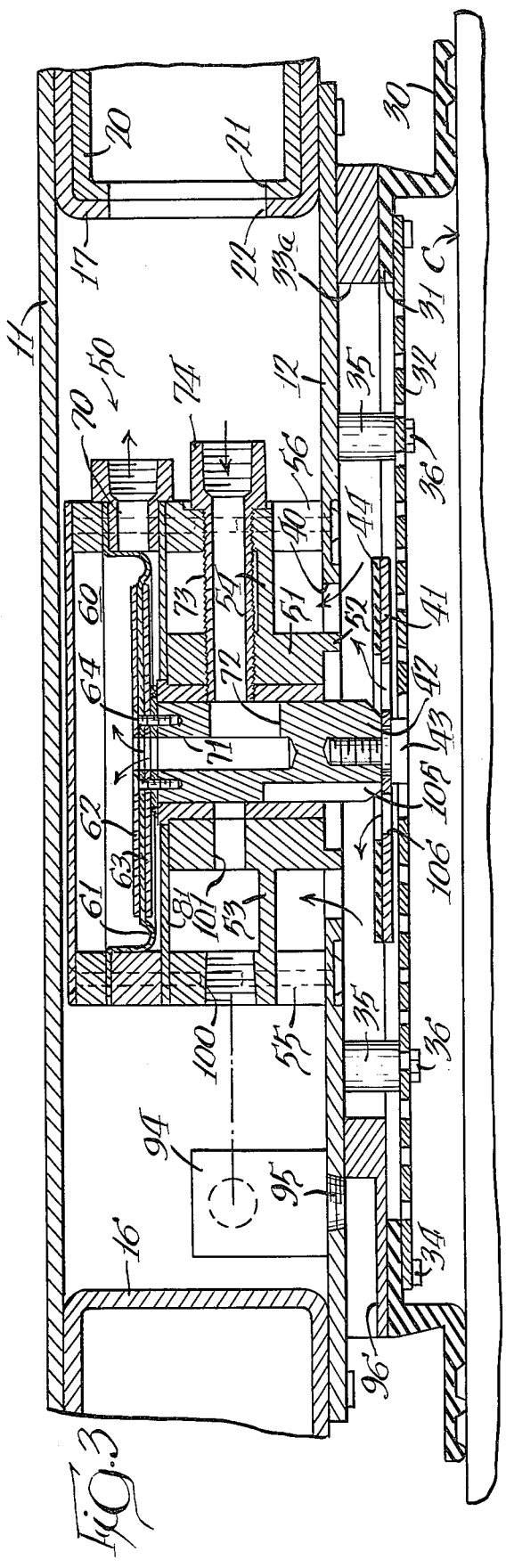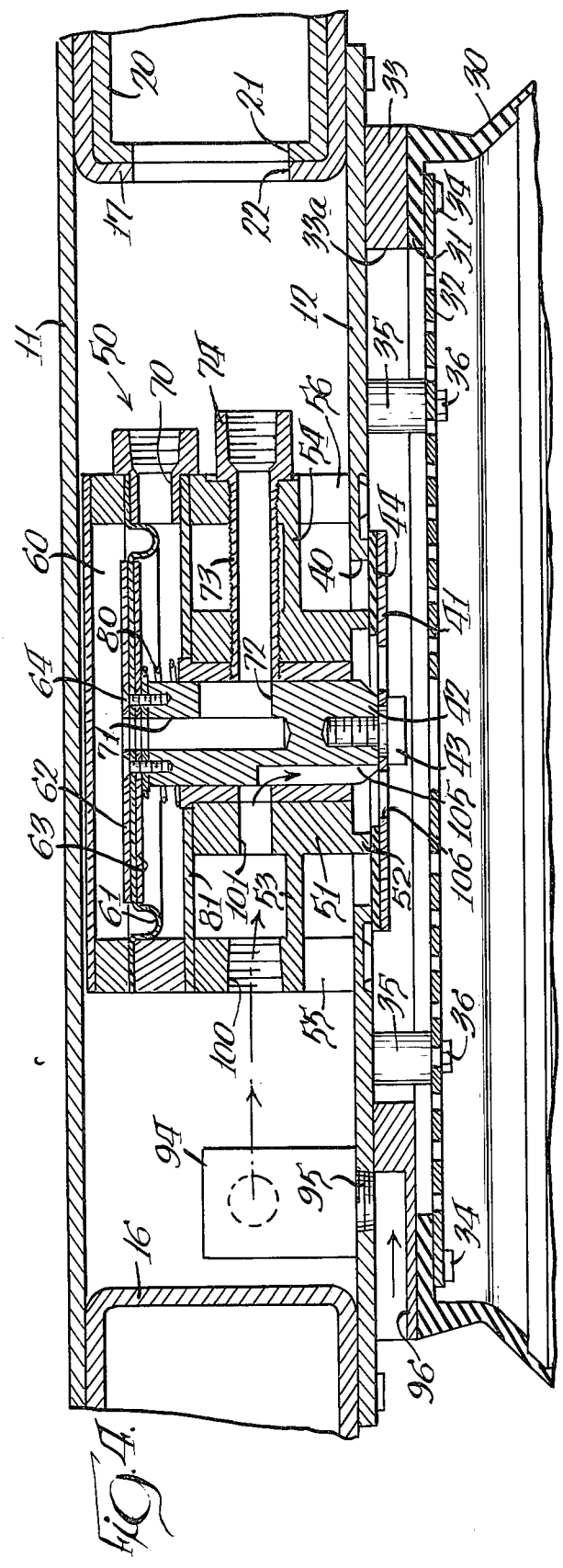

VACUUM PICKUP HEAD

BACKGROUND OF THE INVENTION

This invention pertains to container-handling structure and, more particularly, a vacuum pickup head usable individually or in multiples with structure, such as a stacker crane, to provide for container handling as part of an article-picking apparatus.

The prior art has had order-picking apparatus with vacuum pickup heads, with the assignee of this application having built such a structure wherein the vacuum pickup head had an internal vacuum chamber and a rotatable valve plate was operated by a solenoid to move between open and closed positions to control application of a vacuum to a space beneath the head which overlies a container and is sealed thereto by a container-engaging seal element. A structure of this type is shown in an abandoned application, Ser. No. 427,064, filed Dec. 21, 1973.

Additional prior art is diclosed in U.S. Pat. Nos. 3,697,112 and 3,716,147 wherein solenoid-operated valves are operable to connect a vacuum line to vacuum pickup heads and with the last-mentioned patent showing means for directing air to the heads to facilitate release of containers held thereby.

SUMMARY OF THE INVENTION

A primary feature of the invention disclosed herein is to provide a vacuum pickup head, usable individually or in multiples, having a shallow profile to require minimum height for insertion and withdrawal relative to a storage location and with positively operable valve structure which can open to permit large volumes of airflow for a fast, firm holding action of a container engaged by the head.

Another feature of the invention is to provide a vacuum pickup head having a casing with an interior vacuum chamber and a depending container-engaging seal element to seal the space between the casing and a container, with the bottom wall of the casing having a passage to connect the space with the vacuum chamber, a valve plate movable toward and away from the bottom wall between passage open and passage closed positions, and fluid-powered motor means for moving said valve plate.

Further advantages of the invention are to provide a pickup head as defined in the preceding paragraph wherein the passage in the bottom wall is of an annular shape to provide a large opening for airflow and the valve plate is in the shape of a disc movable against the bottom wall to close the annular passage and with said disc having a series of openings therethrough whereby, as the valve plate closes, air is caused to flow through said series of openings into said space for quick release of the vacuum and release of the engagement of a container.

Another advantage of the invention is to provide a structure of the type defined in the preceding paragraph wherein the valve plate disc is connected to a valve stem movable within a housing positioned in the casing and with the housing having a cylinder with a diaphragm positioned therein and connected to the valve stem. The diaphragm has its underside exposed to vacuum at all times and with the upper side thereof alternately exposed to either vacuum or atmospheric air whereby the differential pressure created by atmospheric air causes movement of the valve stem to position the valve plate in open position and with the differential area of the diaphragm responsive to the differential pressure being greater than the area of the valve plate exposed to the annular vacuum passage whereby the air-operated diaphragm motor may positively open the valve plate.

Other features and advantages of the invention will be more fully set forth in connection with the detailed description of the structure disclosed herein.

BRIEF DESCRIPTION OF THE DRAWING

FIG. 1 is a plan view of the vacuum pickup head with a top wall of the casing omitted;

FIG. 2 is a fragmentary section, taken generally along the line 2—2 in FIG. 1;

FIG. 3 is a vertical section, taken generally along the line 3—3 in FIG. 1; and

FIG. 4 is a view, similar to FIG. 3, showing the mechanism in a different position.

DESCRIPTION OF THE PREFERRED EMBODIMENT

The vacuum pickup head is shown generally at 10 in FIG. 1 and is generally square in plan. One or more of the vacuum cup heads may be mounted on movable structure for movement into a position overlying a layer of containers, such as containers carried on a pallet positioned within a storage bin of a storage rack. A selected number of the vacuum pickup heads may then be activated to engage containers disposed therebeneath to apply a vacuum to a sealed space. This enables lifting and withdrawal of the container from the pallet in the storage bin for transport to a different position. The general arrangement of structure for moving the vacuum pickup heads is well known in the art.

The vacuum pickup head has a casing with a top wall 11 and a bottom wall 12 which, with perimetral strengthening walls, as shown at 15, 16 and 17, define a vacuum chamber connectable to a suitable manifold by a conduit 20 and with flow communication to the vacuum chamber through an opening 21 in the conduit and an opening 22 in the perimetral wall 17.

The casing has a depending container-engaging seal element 30 of flexible, rubber-like material and having four sides to define a generally square seal member for engagement with a container, indicated at C in FIG. 3. The seal element 30 has an inturned flange 31 extending therearound which is engaged between a perforated plate 32 and a plate 33 and with these parts secured to the bottom wall 12 of the casing by threaded members 34. A plurality of spacers 35 are positioned between the perforated plate 32 and the bottom wall 12 and are held in position by additional threaded members 36.

The bottom wall 12 of the casing has an annular vacuum passage 40 which opens to a central recess defined by a wall 33a in plate 33 for applying a vacuum to the space beneath the casing and enclosed by the seal element 30 dependent upon the position of a valve plate 41. The valve plate 41 is in the form of a flexible disc having its center fastened to the lower end of a valve stem rod 42 by a threaded member 43 and having an annular sealing member 44 positioned to move against the bottom wall 12 and close the annular vacuum passage 40. The valve plate disc 41 being flexible assures a good seal of the annular sealing member 44 against the casing bottom wall. The vacuum above the valve plate assures that the valve plate is tightly closed.

A housing, indicated generally at 50, is mounted within the vacuum chamber and has a cylindrical part 51, with a depending flange 52 forming the inner periphery of the annular vacuum passage 40. Laterally-extending parts 53 and 54 of the housing are positioned above the casing bottom wall 12 and supported by spacers 55 and 56 held in fixed position by suitable threaded members whereby the annular vacuum passage 40 communicates with the interior of the vacuum chamber by flow past the spacers 55 and 56.

The upper part of the housing 50 has an enclosed cylindrical chamber 60 mounting a flexible diaphragm 61 fastened at its periphery between parts of the housing 50 and the central part thereof is captured between a pair of plates 62 and 63 which are secured to the upper end of the valve stem 42 by threaded members 64. This structure defines a fluid-powered motor for movement of the valve stem 42 within a bore formed in the central part 51 of the housing and between the positions shown in FIGS. 3 and 4. The valve stem 42 and valve plate 41 are shown in a lower open position in FIG. 3 and in an upper, closed position, in FIG. 4. The part of the cylinder 60 beneath the diaphragm 61 is connected to the vacuum chamber at all times through a port 70 opening to the vacuum chamber.

The upper side of the diaphragm is alternately exposed either to vacuum or to atmospheric air by means of an open-ended bore 71 and a transverse passage 72 in the valve stem 42 which, in all positions of the valve stem, communicates with an air line 73 fitted within the housing 50 and having a pipe connection 74. When atmospheric air is communicated to the air line 73, the motor and valve stem are positioned, as shown in FIG. 3, since the differential pressure acting on the diaphragm (with a vacuum existing on the underside thereof) results in forcing the valve stem 42 downwardly and against the action of a return spring 80 surrounding the valve stem 42. The return spring 80 engages between the lower diaphragm-engaging plate 63 and a wall 81 of the housing. When the air line 73 is connected to vacuum, the same pressure condition exists on both sides of the diaphragm 61, whereby there is no pressure differential in the motor and the spring 80 is effective to raise the valve stem and move the valve plate 41 to the closed position shown in FIG. 4.

The position of the diaphragm motor is controlled by a double coil piloted three-way valve, indicated generally at 90 in FIG. 1, having its normal exhaust port 91 opening to the interior of the vacuum chamber and a second port 92 connected by a line 93 to a fitting 94 which has an opening 95 (FIGS. 3 and 4) connected to a passage 96 in the plate 33 which opens to atmosphere. With the fitting 94 having an interior communicating the opening 95 to the line 93, there is always atmospheric pressure delivered to the valve port 92. The other port 97 of the control valve is connected by a line 98 to the fitting 74 of the air line 73. In one position of the control valve, the line 98 communicates with the exhaust port 91 and, thus, line 98 has the vacuum pressure therein. In the other position of the valve 90, the line 98 is effectively connected to the line 93 whereby the line 98 has atmospheric pressure therein.

In operation of the vacuum pickup head, the structure is in the position shown in FIG. 4 and when lowered onto the top of a container, the seal element 30 deflects to closely engage the top of the container C. During this time, the air line 73 is connected to vacuum whereby the diaphragm motor is in the position shown in FIG. 4. When a container is engaged, the valve 90 can then be shifted to its other position whereby atmospheric pressure through line 93 is applied to line 98 and the air flows through the air line 73 and the bore 71 of the valve stem to the open upper end thereof to be applied against the top side of the diaphragm 61. This results in a differential pressure acting on the diaphragm to lower the valve stem and the valve plate 41. This opens the annular vacuum passage 40, as shown in FIG. 3. With the parts in the closed position of FIG. 4, there is a differential pressure acting on the valve plate 41 in a direction to maintain the valve plate 41 closed, since there is atmospheric pressure on the underside and vacuum acting on the area of the annular sealing element 44 open to the annular vacuum passage 40. The differential area of the diaphragm which acts to urge the valve plate downwardly is greater than the differential area of the valve plate responsive to differential pressure to hold the valve plate closed and, thus, the valve plate 41 will be opened when atmospheric pressure is applied to the upper side of the diaphragm 61.

When it is desired to release the container C, the solenoid valve 90 is shifted back to its original position, whereby the upper side of the diaphragm 61 is connected to vacuum, with the result that the diaphragm is balanced and the spring 80 urges the valve stem and the valve plate 41 upwardly to the closed position of FIG. 4. There is a pressure drop through the orifice created between the annular vacuum passage and the annular sealing element 44 as they move toward closed position which assists in fast closing of the valve plate.

An added feature of the invention is the provision of a second air conduit in the housing 50 including a port 100 and a passage 101 which connect with the fitting 94 through a line 102 whereby atmospheric pressure at all times exists at port 101 and this port 101 selectively communicates with a longitudinally-extending groove 105 in an outer surface of the valve stem 42. When a vacuum is being applied to the space beneath the casing, as shown in FIG. 3, the port 101 and the groove 105 are out of communication whereby there is no effect on the vacuum being applied. As the valve plate 41 moves upwardly toward the closed position of FIG. 4, the groove 105 will come into communication with the port 101 shortly prior to complete closing of the valve plate. This results in atmospheric air entering the sealed space by downward travel through the stem groove 105 through openings 106 in the valve plate disc 41 and through perforated plate 32 to destroy the vacuum within the sealed space to permit ready release of the container C and to also assist in final closing of the valve plate.

The double coil piloted three-way valve 90 is responsive to two different signals in controlling the action of the vacuum pickup head. When the vacuum pickup head is lowered onto a container C, a contact plate 110 is moved upwardly to permit operation of a switch 111 to a position to energize one of the coils of the valve. The contact plate 110 is mounted at the lower end of a stem 112 which is movable within a tube 115 positioned within the vacuum chamber, with the stem 112 having a laterally-extending pin 116 urged by a pair of springs 117 to a lowered position within a pair of slots 118 in the tube to position the contact plate 110 in its lowermost position. When a container C is engaged by the contact plate 110 during lowering of the vacuum pickup head, there is upward movement of the stem within the tube 115 against the action of the springs 117 whereby a contact finger 120 permits movement of the switch arm 121. A control circuit (not shown) may determine which valves of which heads are to operate and the contact plate 110 may merely confirm that a container is present.

The other coil of the valve would be activated by the control circuit which determines the appropriate time for release of a container and for movement of the valve plate 41 to the closed position of FIG. 4.

With the structure disclosed herein, it will be seen that a shallow profile vacuum pickup head has been provided wherein the annular vacuum passage permits the flow of large volumes of air for quick action. The structure is operable with a fluid-operated motor means, avoiding a requirement for solenoids drawing substantial power and subject to burn-out problems. The use of a solenoid to shift the valve plate would also add to the height of the vacuum pickup head. The linearly-movable valve plate and valve stem provide improved action in opening and closing and with the valve stem providing for an automatic shot of air at the closing of the valve plate to facilitate closing as well as to provide positive release of a container which has been held by a vacuum.

I claim:

1. A pickup head for vacuum holding of a container comprising, a casing with an interior vacuum chamber and a depending container-engaging seal element to seal the space between said casing and a container, a bottom wall of said casing having a passage to connect said space with said vacuum chamber, valve means for controlling communication between said chamber and said space including a two position valve plate movable toward and away from said bottom wall between passage open and passage closed positions, and fluidpowered motor means for moving said valve plate.

2. A pickup head as defined in claim 1 wherein said passage is annular and said valve plate is a disc, and a rod positioned centrally of said passage and interconnecting said disc and fluid-powered motor means.

3. A pickup head as defined in claim 2 wherein said fluid is air and said motor means includes a diaphragm member having one side thereof in communication with said vacuum chamber and the other side in communication with either said vacuum chamber or with atmosphere.

4. A pickup head as defined in claim 3 including an air line extended to said other side of the diaphragm member, and a control valve having a pair of ports connected one to the vacuum chamber and one to atmosphere and a third port connected to said air line.

5. A pickup head as defined in claim 2 wherein said disc has an annular sealing member for engaging said bottom wall to close off said annular passage, a series of openings through said disc within the perimeter of said annular sealing member, and a passage in said rod operable to direct atmospheric air through said series of openings as said valve plate moves to closed position to assist in release of a container and closing of said valve plate.

6. A pickup head for vacuum holding of a container comprising, a casing, a depending container-engaging seal element to engage a container and seal the space between said casing and a container, said casing having walls including a top wall and a bottom wall defining a vacuum chamber with an annular passage through said bottom wall, a housing positioned within said vacuum chamber and centrally of said passage, a valve stem movable within said housing and extended downwardly to a level beneath said bottom wall, a valve plate fastened to the lower end of said valve stem and movable between a position closing said annular passage and an open position, motor means in said housing including a cylinder with a pressure responsive diaphragm therein and which is connected to said valve stem, means connecting the underside of said diaphragm to said vacuum chamber, an air line extended to the other side of the diaphragm, a control valve connected to said air line for either directing atmospheric air to said air line to cause a differential pressure on the diaphragm and move the valve stem and open the valve plate or connecting the air line to the vacuum chamber to balance the diaphragm, and means for closing the valve plate when the diaphragm is balanced.

7. A pickup head as defined in claim 6 wherein said valve plate is a disc with an annular sealing member to engage said bottom wall and close said annular passage, a series of openings through said disc, a second air conduit in said housing, and a groove on said valve stem extending to the lower end thereof and positioned to communicate with said second air conduit as the plate closes to direct air through the valve plate disc openings and break the seal of a container to the head.

8. A pickup head as defined in claim 7 wherein said air line includes an open-ended bore in said valve stem opening to an end of the valve stem above said diaphragm, a transverse passage in said valve stem, and a conduit in said housing, with said transverse passage having a length to communicate with said last-mentioned conduit in all positions of the valve stem.

9. A pickup head as defined in claim 6 wherein the differential area of the diaphragm responsive to differential pressure to open the valve plate exceeds the area of said annular passage acted upon by differential pressure to hold the valve plate closed.

10. A pickup head as defined in claim 6 wherein said control valve is a double coil piloted three-way valve responsive to both a box detect signal and a box release signal.

* * * * *